(No Model.)
E. FRISCHKNECHT.
HEAT REGULATOR.
No. 554,671. Patented Feb. 18, 1896.
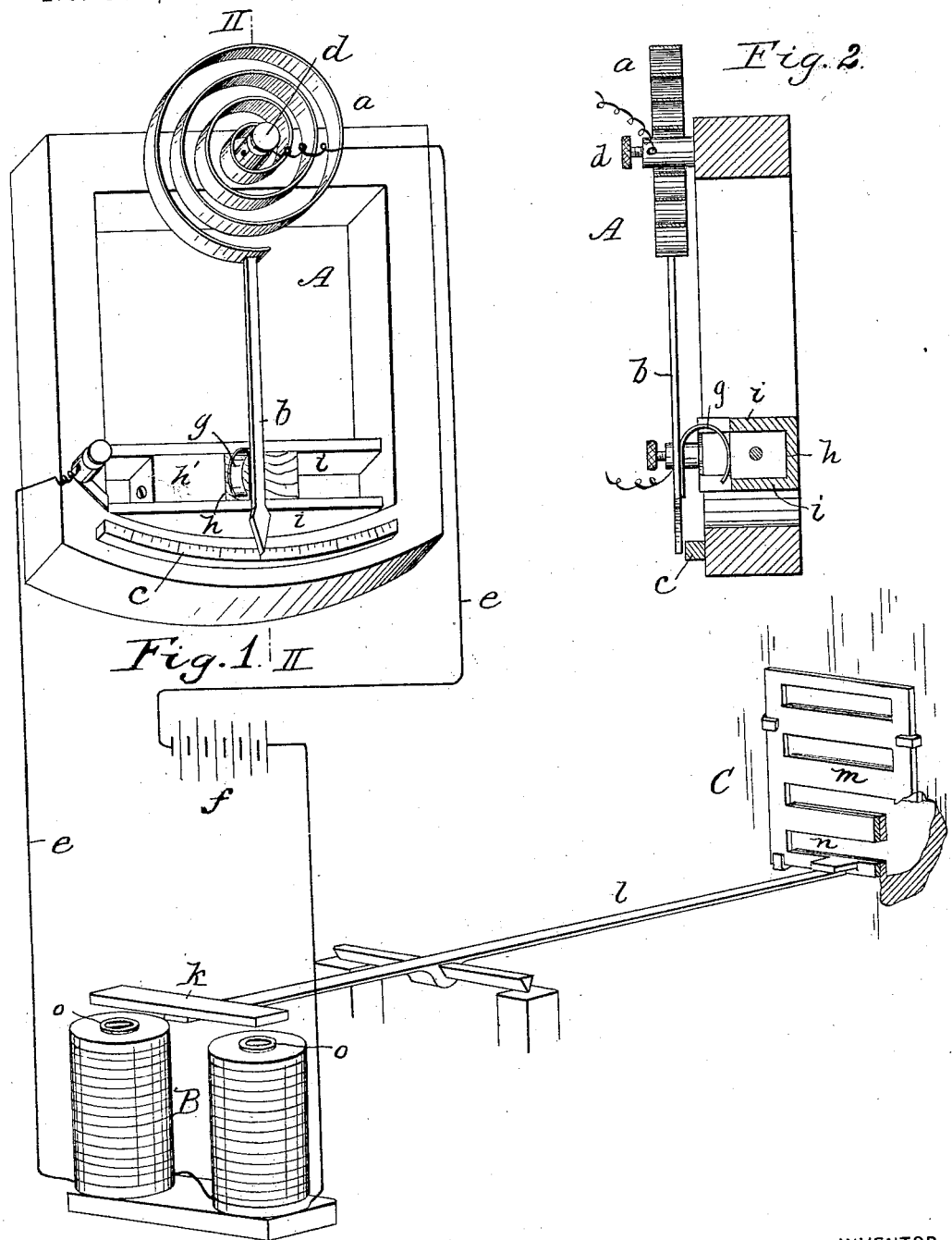
WITNESSES:
Jas. E. Hutchinson
J. S. Barker
INVENTOR
Emil Frischknecht
BY
Graham & Low
ATTORNEYS.

UNITED STATES PATENT OFFICE.

EMIL FRISCHKNECHT, OF NEW YORK, N. Y.

HEAT-REGULATOR.

SPECIFICATION forming part of Letters Patent No. 554,671, dated February 18, 1896.

Application filed March 9, 1895. Serial No. 541,149. (No model.)

*To all whom it may concern:*

Be it known that I, EMIL FRISCHKNECHT, a citizen of Switzerland, residing in the city, county, and State of New York, have invented certain new and useful Improvements in Heat-Regulators, of which the following is a specification.

The present invention relates generally to automatic means for regulating the temperature of rooms, buildings, and the like; and it consists substantially of a thermometer, an electric motor operating a heat-regulator, an electric circuit extending from the thermometer to the motor, and an adjustable contact included in said circuit for determining the time of operation of the motor, the operation being such that when the temperature of the room or other place in which the thermometer is mounted reaches a predetermined point at which the adjustable contact has been placed the circuit is, for instance, closed, the motor energized, and the heat-regulator moved.

The accompanying drawings illustrate an embodiment of the invention in a form adapted for practical use, not intended, however, to limit the invention to the embodiment, which, for the purposes of this case, has been delineated.

In said drawings, Figure 1 is a perspective view in diagram of the improvement. Fig. 2 is a sectional view on line II II, Fig. 1, of the thermometer and adjustable contact, irrespective of the motor and the heat-regulator *per se.*

In illustrating my invention I have chosen for representation a metallic thermometer A of any ordinary form, say, consisting of a metallic spiral coil $a$ of two metals, copper and zinc. From one end of the spiral extends an index $b$ arranged to travel over a division plate or dial $c$, bearing units and fractions of units of heat measurement of any desired scale. The spiral coil $a$ is in a circuit $e$, its inner end being connected to a binding-post $d$, with a battery or other source of electrical energy $f$; and the index, the major portion of which is of metal or has metallic connection with the spiral coil, has a contact $g$ near its lower end arranged to move over another contact $h$. The contact $g$ is preferably a spring-contact adapted to bear frictionally as the index moves against the surface of the contact $h$, and this latter contact is a movable or adjustable one, consisting in the preferred construction of a slide in the main of a non-metallic or insulating body bearing a metallic portion $h'$, the whole being arranged to move and be guided between a pair of guides $i$, one or both of which are of metal and with which the metallic portion $h'$ is in constant contact, the guide or guides being in the circuit $e$. From this arrangement it results that as soon as the contact $g$ bears against the metallic portion of the adjustable contact $h$ the circuit will be completed from the battery to the inner end of the coil through the index, two contacts, and thence through one or both of the guides $i$ and return to the battery.

The adjustability of the adjustable contact renders it possible to locate such contact at any desired position with respect to the index and the scale or dial over which its end moves, so that as soon as said index arrives at a predetermined position the circuit will be affected either to open or close it, and thus a motor arranged in the circuit may be operated to move a heat-regulator.

The motor B, chosen for illustration, consists of an electromagnet in the circuit $e$, having an armature $k$, the long arm of the lever $l$ carrying the armature being shown connected to move a heat-regulator C, consisting, for instance, of a slide $m$ of an ordinary register arranged to cover and open a series of lantern-openings $n$ governing the passage of heated air from, say, a furnace into the room or space in which the improved heat-regulator is arranged.

As shown, the apparatus is arranged to operate on a closed circuit, (either an open or closed circuit may be used,) so that when the contact carried by the index bears against the metallic portion of the adjustable contact, thus closing the circuit, the magnet is energized, attracting the armature and thereby moving the slide $m$ to close the openings $n$ and thus shut off further supply of heat. The magnet continues energized so long as the circuit remains closed. As soon as the index under the lessening temperature moves its contact from the metallic portion of the adjustable contact, the circuit will be broken and the weight of the slide $m$ will rock the armature from the poles of the magnet and thus open the openings n.

To prevent the residual magnetism from causing the armature to stick to the magnet-poles at the breaking of the circuit, rubber rings o may be placed on the ends of the magnet-poles, forming a cushion and receiving the blow of the armature at the instant of attraction, thus lessening the noise of operation and serving by their inherent spring to slightly raise the armature from the poles at the instant of the breaking of the circuit.

It will be understood that the several devices going to form the complete embodiment of the invention are merely illustrative of devices which may be used in practice, and hence the invention is not to be limited to the type of devices shown, as it is recognized others may be substituted therefor without departing from the scope hereof.

What I claim is—

1. A thermal circuit-closer for heat-regulators and other purposes consisting of a movable electric contact, means for moving the same upon a change of temperature, an adjustable contact having a metallic and an insulating portion, and conducting-guides for the latter contact adapted to be connected with an electric circuit.

2. A thermal circuit-closer for heat-regulators and other purposes consisting of a movable contact g, a spiral a and index b carrying the same, an adjustable contact having conducting and insulating parts h', h, guides i, i for the latter contact, and a scale c.

3. A thermal circuit-closer for heat-regulators and other purposes consisting of a freely-movable index hand or pointer having a contact, means for actuating the same by a change in temperature, and a second contact having conducting and insulating portions with its face parallel with the plane of movement of the former contact so that the movable contact may pass from one to another of said portions of the adjustable contact as it passes over said surface.

In witness whereof I have hereunto signed my name in the presence of two witnesses.

EMIL FRISCHKNECHT.

Witnesses:
GEO. H. GRAHAM,
E. L. TODD.